United States Patent
Lin

(10) Patent No.: US 10,144,343 B2
(45) Date of Patent: Dec. 4, 2018

(54) CAR DOOR GROMMET PLUG

(71) Applicant: KENG LIEN INDUSTRIAL CO., LTD., Taichung (TW)

(72) Inventor: Kuo-Hsing Lin, Taichung (TW)

(73) Assignee: KENG LIEN INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 15/784,611

(22) Filed: Oct. 16, 2017

(65) Prior Publication Data
US 2018/0319322 A1 Nov. 8, 2018

(30) Foreign Application Priority Data
May 3, 2017 (TW) ............................. 106206181 U

(51) Int. Cl.
| | |
|---|---|
| *B60Q 1/00* | (2006.01) |
| *B60Q 1/26* | (2006.01) |
| *F21V 23/00* | (2015.01) |
| *F21V 23/04* | (2006.01) |
| *F21V 7/04* | (2006.01) |
| *F21V 13/04* | (2006.01) |
| *B60R 16/02* | (2006.01) |
| *F21V 5/04* | (2006.01) |
| *F21Y 115/10* | (2016.01) |

(52) U.S. Cl.
CPC ......... *B60Q 1/2669* (2013.01); *B60Q 1/0088* (2013.01); *B60R 16/0222* (2013.01); *F21V 5/04* (2013.01); *F21V 7/048* (2013.01); *F21V 13/04* (2013.01); *F21V 23/005* (2013.01); *F21V 23/0442* (2013.01); *F21Y 2115/10* (2016.08)

(58) Field of Classification Search
CPC ....... B60Q 1/2669; B60Q 1/0088; F21V 5/04; F21V 13/04; F21V 7/048; F21V 23/0442; F21V 23/005; B60R 16/0222; F21Y 2115/10
See application file for complete search history.

(56) References Cited

U.S. PATENT DOCUMENTS

| | | | |
|---|---|---|---|
| 2006/0160385 A1* | 7/2006 | Tsukamoto ......... | B60R 16/0222 439/157 |
| 2007/0095571 A1* | 5/2007 | Kim .................... | B60R 16/0222 174/665 |
| 2011/0030192 A1* | 2/2011 | Okitsu ................ | B60R 16/0222 29/450 |

* cited by examiner

*Primary Examiner* — Tracie Y Green
(74) *Attorney, Agent, or Firm* — Egbert Law Offices, PLLC

(57) ABSTRACT

A car door grommet plug has a holder, a light-emitting unit located in the holder, a top cap mounted on the top of the holder and restraining the light-emitting unit and a shell located in the holder. The light-emitting unit is electrically connected to a power supply. When the opening of car door is sensed, the light-emitting unit emits light outwards, providing a caution signal for vehicles or pedestrians coming from behind.

18 Claims, 10 Drawing Sheets

CAR DOOR GROMMET PLUG

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a sealing structure, and more particularly to the innovative structure type of a car door grommet plug with lighting caution function.

2. Description of Related Art Including Information Disclosed Under 37 CFR 1.97 and 37 CFR 1.98

In some car structure designs, there is a maintenance and repair operation hole somewhere in the outer end wall of the car door for tools to be inserted for repairing the mechanisms in the door or plate working. As the maintenance and repair operation hole is useless at ordinary times, considering the esthetic appearance and anti-seepage, related circles developed a fitting known as a car door grommet plug (or car door grommet blanking cover) to seal the maintenance and repair operation hole.

At present, the car door grommet plug structure design on the market is usually a circular soft plug made of rubber. This simple form has simple structure and low manufacturing cost, but related industrial circles always hope to endue the like products with a novel creativity, added value or utility function, so as to exceed competitors and obtain the consumers' favour, and to meet the consumers' diversified needs for novelty and change. Therefore, in terms of the present development stage of the known car door grommet plug structure, there is obviously considerable room for improvement.

BRIEF SUMMARY OF THE INVENTION

A light-emitting unit, top cap and flexible cock body form the innovative unique structure type and technical characteristics of the "car door grommet plug" disclosed in the present invention, in comparison to the known structures proposed by previous techniques, the present invention endues the car door grommet plug products with light caution function and added value, enhancing the safety of drivers during parking and it is practically progressive.

DETAILED DESCRIPTION OF THE INVENTION

Figure 1:
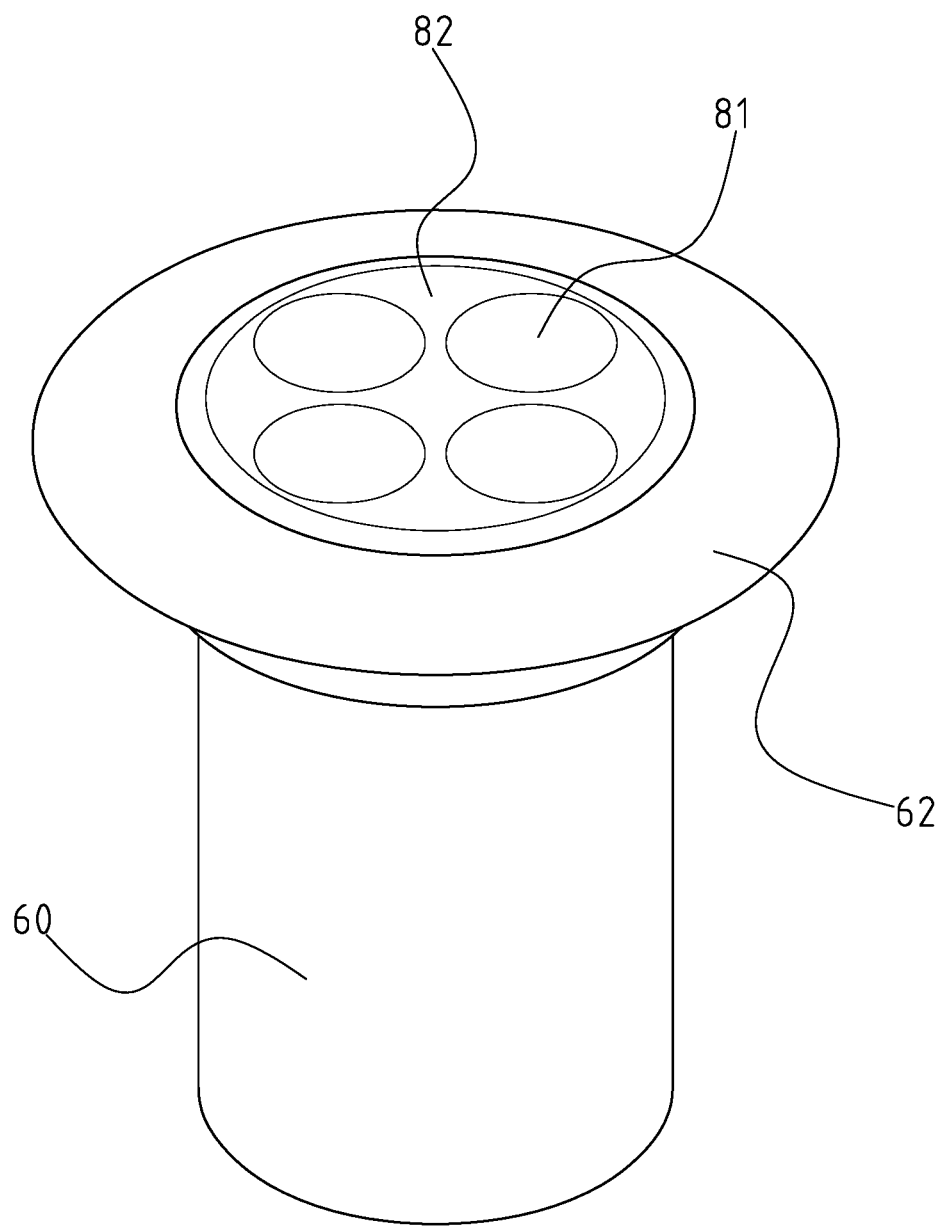
FIG. 1 is a three-dimensional outside view of the first preferred embodiment of the present invention.

FIGS. 1 to 4 show the first preferred embodiment of the car door grommet plug of the present invention, but this embodiment is for illustration only, the patent application is not limited to this structure. In this preferred embodiment, the car door grommet plug comprises a holder 60, a light-emitting unit 70 located in the holder 60, a top cap 80 mounted at the top of the holder 60 and restraining the light-emitting unit 70 and a shell 91 assembled on the holder 60. The light-emitting unit 70 is electrically connected to a power supply 92.

In this preferred embodiment, the shell 91 is a cylindrical structure with a closed end and an open end, and the power supply 92 is contained in the shell 91. The light-emitting unit 70 corresponds to the open end of the shell 91, and the inner margin of open end of the shell 91 is provided with an internal thread part 93. In this preferred embodiment, the power supply 92 comprises three mercury cells connected in series.

Figure 4:
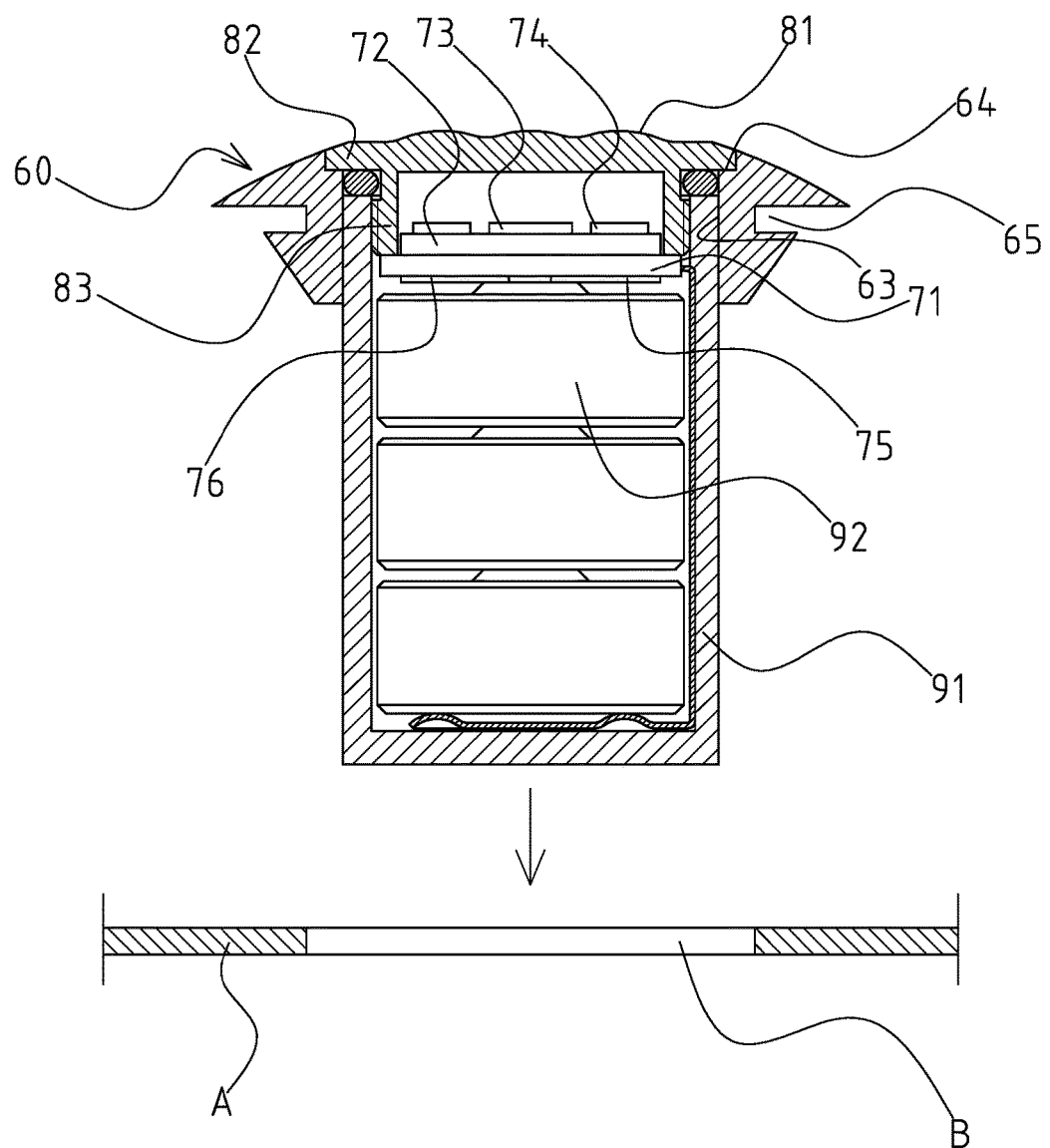
FIGS. 4 and 5 are actuation schematics of the first preferred embodiment of the present invention.
Figure 5:
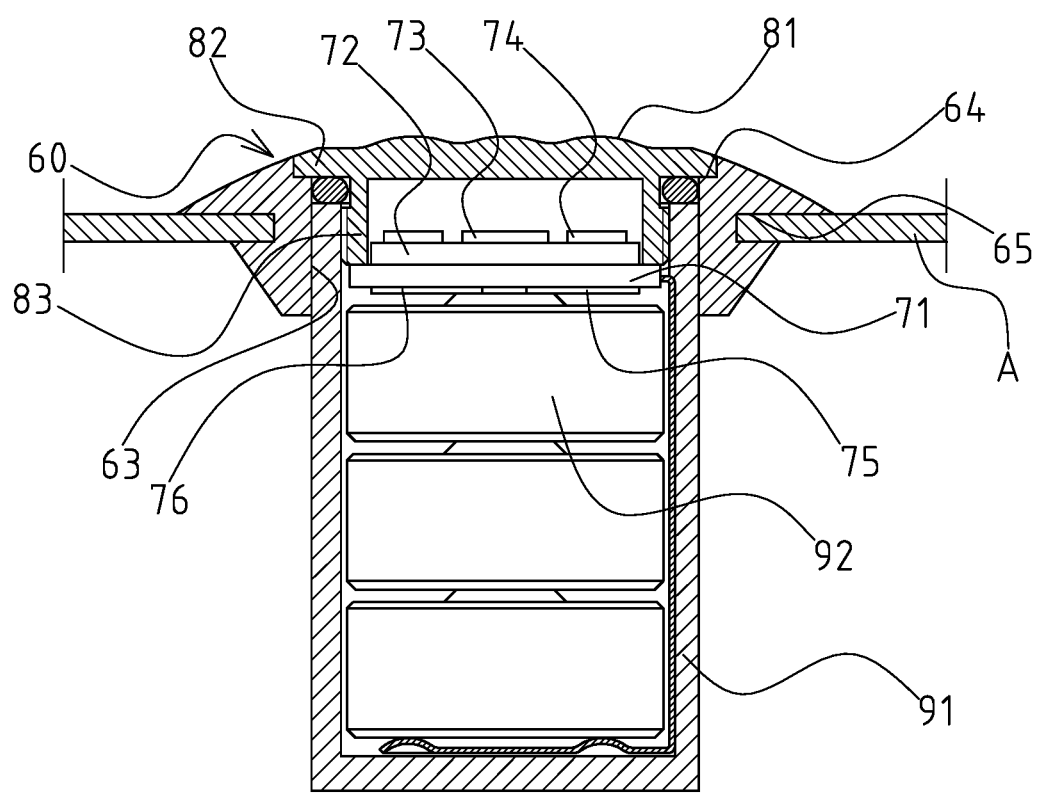
Figure 6:
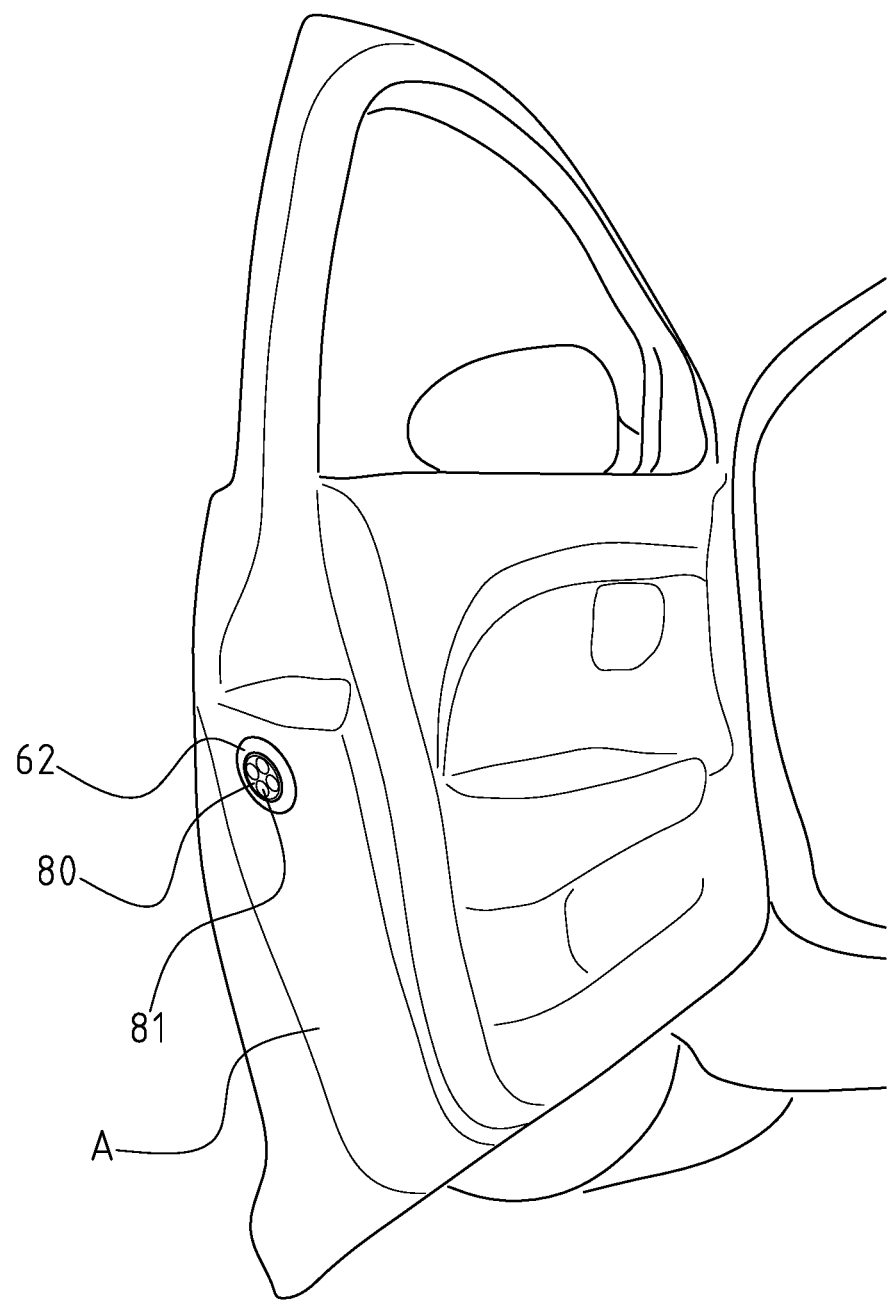
FIG. 6 is an operating condition reference diagram of the first preferred embodiment of the present invention.
Figure 7:
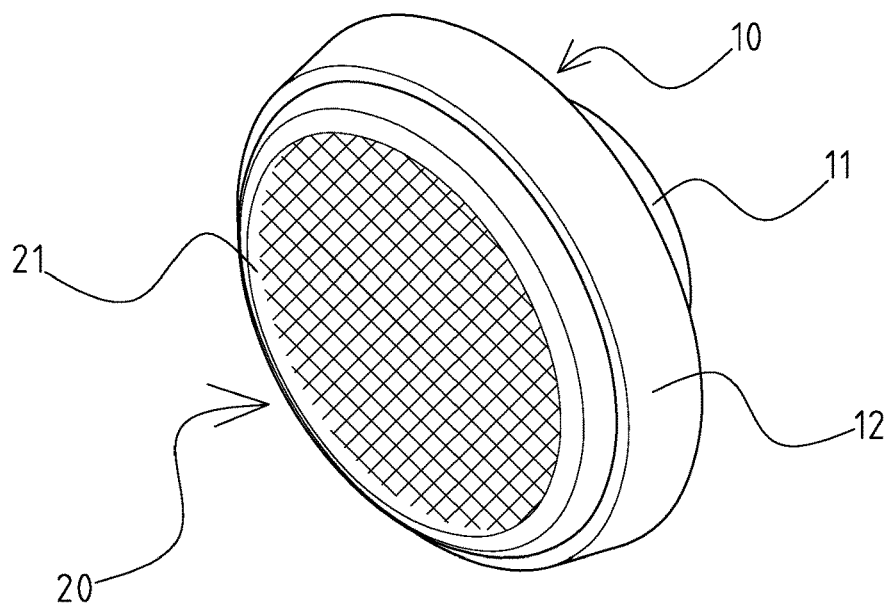
FIG. 7 is a three-dimensional outside view of the second preferred embodiment of the present invention.

As shown in FIGS. 4 to 6, the holder 60 is made of flexible material and embedded in the circumference of car door grommet B. The holder 60 comprises a plug-in unit 61 and a flange 62 around the plug-in unit 61. When the plug-in unit 61 of the holder 60 is plugged in the car door grommet B, the circumference of the flange 62 clings to the surface of the car door A. A punch hole 63 for the open end of the shell 91 is formed in the holder 60, and a ring slot 64 is formed in the top of inner wall of the punch hole 63. In addition, a ring groove 65 is formed in the exterior of the holder 60, when the present invention is combined with car door A, the ring groove 65 holds the circumference of car door grommet B to position the present invention.

The light-emitting unit 70 comprises a substrate 71, a drive circuit 72 is laid on the top surface of the substrate 71, a sensor 73 and plural illuminators 74. The drive circuit 72 is electrically connected to the power supply 92, and the sensor 73 and the illuminators 74 are electrically connected to the drive circuit 72 respectively. When the sensor 73 is actuated as the ambient environment factor changes, the drive circuit 72 uses the electric energy supplied from the power supply 92 to drive the illuminators 74 to project light outwards. The substrate 71 is provided with a control circuit 75. The control circuit 75 is electrically connected to the drive circuit 72, so as to change the light emission mode of the illuminators 74 and the color of the projected light rays.

The substrate 71 is provided with a booster circuit 76. The booster circuit 76 is electrically connected to the drive circuit 72, so as to increase the voltage supplied from the power supply 92 to the suitable voltage for light-emitting unit 70 when the power supply 92 has voltage drop. In the preferred embodiment of the present invention, the sensor 73 can be magnetic reed switch, magnetic induction switch or electromagnetic switch.

The top cap 80 is provided with at least one lens structure 81, so as the change the characteristic of the light rays projected outwards from the illuminators 74. The top cap 80 comprises a disc body 82 and a skirt body 83 extended from the underside of the disc body 82. The at least one lens structure 81 is located on the disc body 82. The exterior of the skirt body 83 is provided with an external thread part 84 fixed to the internal thread part 93. When the internal thread part 93 and the external thread part 84 are screwed together, the end of the skirt body 83 presses and positions the substrate 71 of the light-emitting unit 70, and the circumference of the disc body 82 is held in the ring slot 64.

FIGS. 7 to 10 show the second preferred embodiment of car door grommet plug of the present invention, but this embodiment is for illustration only, the patent application and interpretation are not limited to this structure.

In this preferred embodiment, the car door grommet plug comprises a holder 10 to be embedded in the circumference of car door grommet B, a light-emitting unit 30 located in the holder 10 and a top cap 20 mounted on the holder 10 and positioning the light-emitting unit 30. The holder 10 is made of flexible material, and the top cap 20 is made of transparent material. The holder 10 comprises a plug-in unit 11, a flange 12 around the plug-in unit 11 and a first punch hole 13 axially formed in the holder 10. When the plug-in unit 11 of the holder 10 is plugged in the car door grommet B, the annular circumference of the flange 12 clings to the surface of the car door A.

The light-emitting unit 30 is electrically connected to a power supply (not shown in figures). The light-emitting unit 30 comprises a substrate 31, a drive circuit 32 is laid on the top surface of the substrate 31, a sensor 33 and plural illuminators 34. The drive circuit 32 is electrically connected to the power supply, and the sensor 33 and the illuminators 34 are electrically connected to the drive circuit 32 respectively. When the sensor 33 is actuated as the ambient environment factor changes, the drive circuit 32 uses the electric energy supplied from the power supply to drive the illuminators 34 to project light rays outwards. In the preferred embodiment of the present invention, the drive circuit 32 is electrically connected to plural power cords 35, and the power cords 35 are electrically connected to the power supply through the first punch hole 13. The power supply is the vehicle's storage battery.

Figure 2:
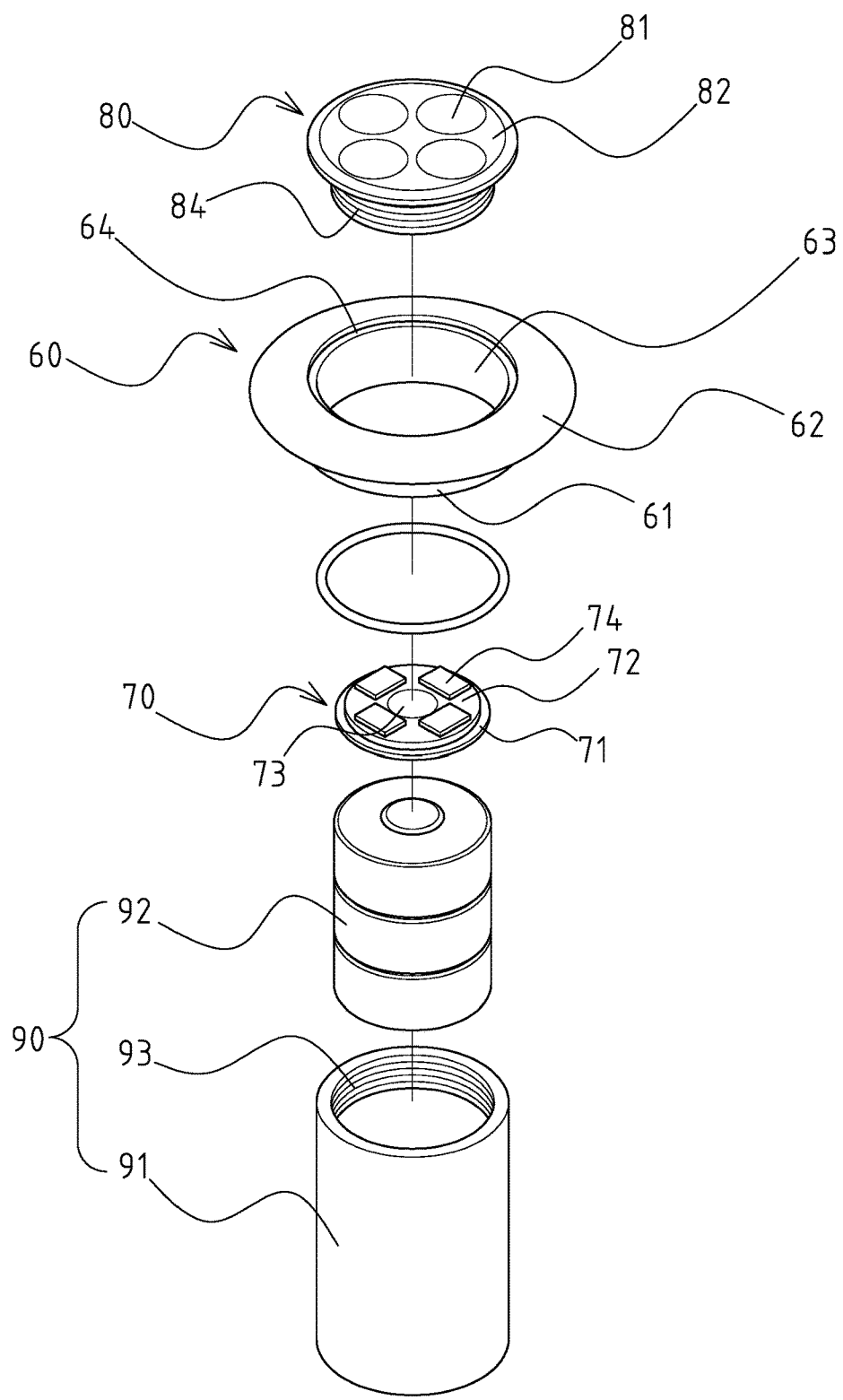
FIG. 2 is a three-dimensional exploded view of the first preferred embodiment of the present invention.
Figure 3:
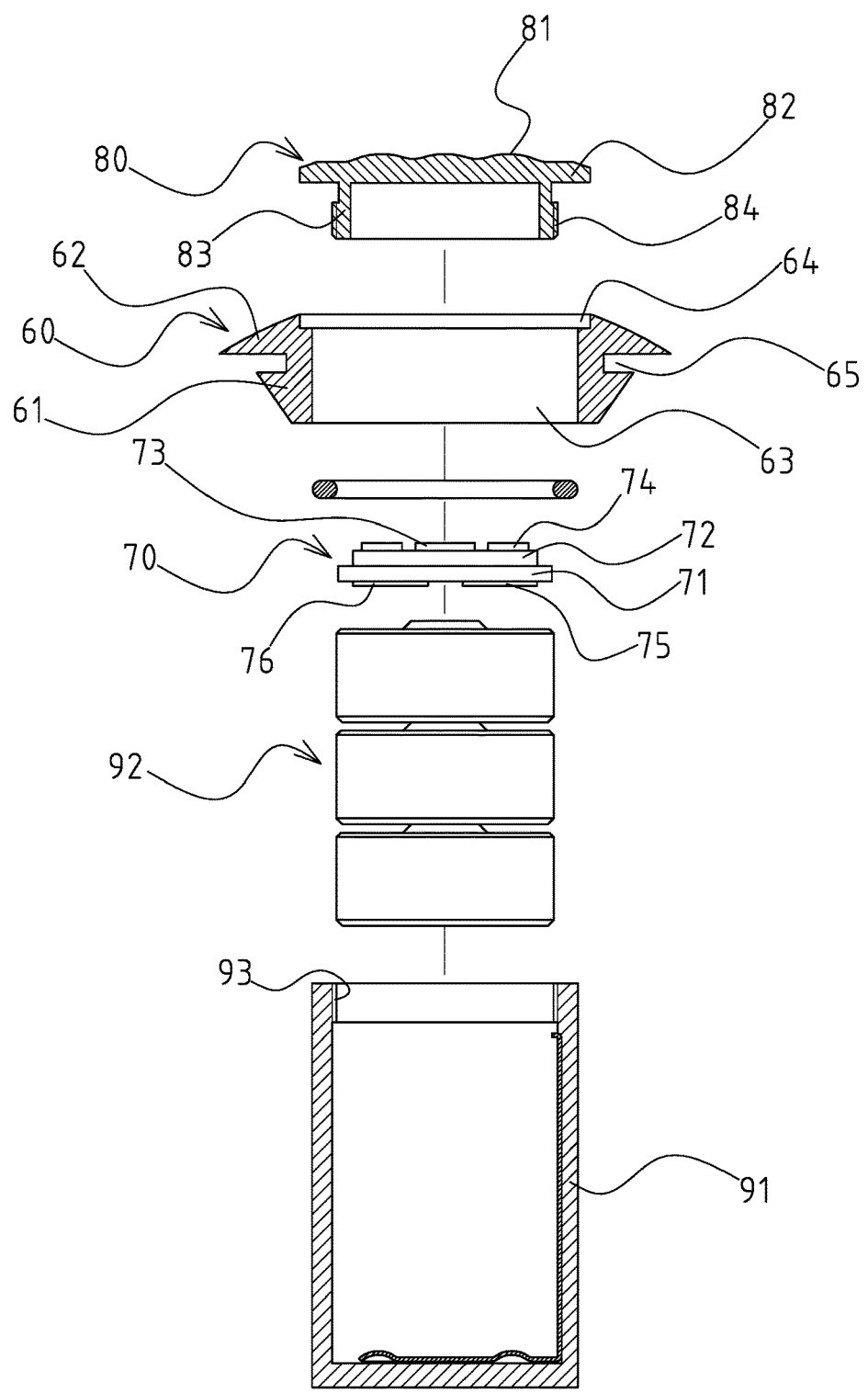
FIG. 3 is an exploded sectional view of the first preferred embodiment of the present invention.

The top cap 20 has a light transmission plane 21, and contains a holding space 22. The substrate 31 and the plural illuminators 34 are located in the holding space 22. As shown in FIG. 5, the inner wall of light transmission plane 21 of the top cap 20 is provided with plural serrated reflection arrays 23. In this embodiment, by means of said light refraction and reflection arrays 23, when the illuminators 34 of the light-emitting unit 30 are lightened, the light through the top cap 20 is refracted and diffused appropriately, and there is reflection effect when extraneous light comes in, there is dual caution effect of light emission and reflection. As shown in FIGS. 2 and 3, the plural illuminators 34 on the substrate 31 of the light-emitting unit 30 are flat LED dies, so as to minimize the assembly space of the illuminators 34, meeting the requirement for thinning the car door grommet plug.

Figure 8:
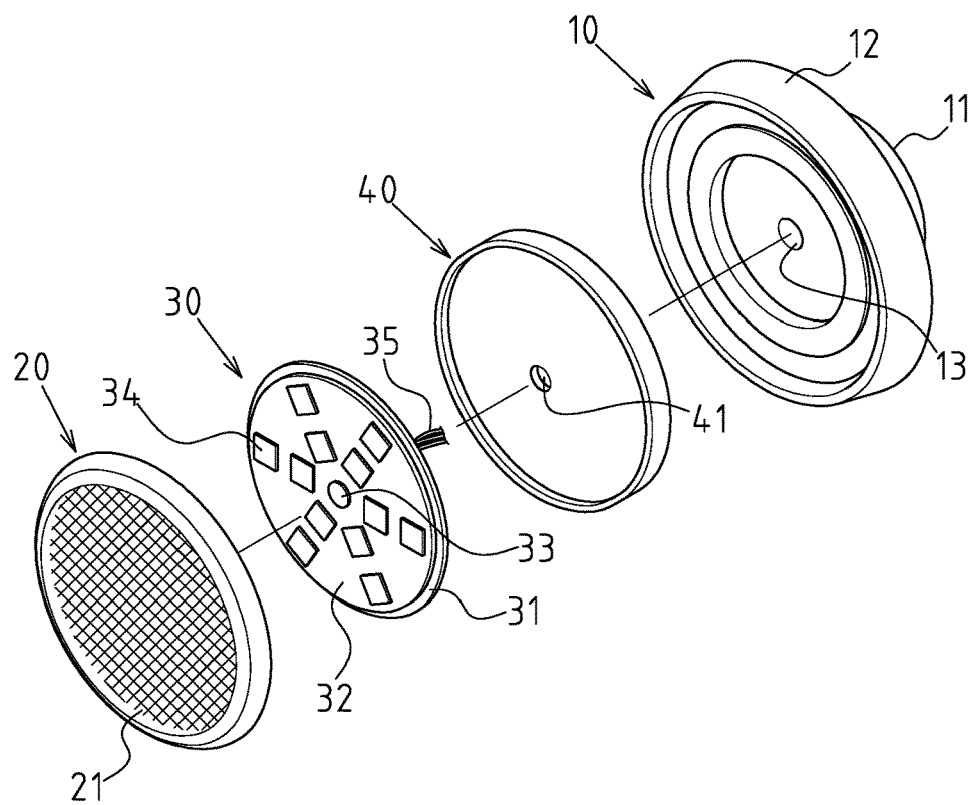
FIG. 8 is a three-dimensional exploded diagram of the second preferred embodiment of the present invention.
Figure 9:
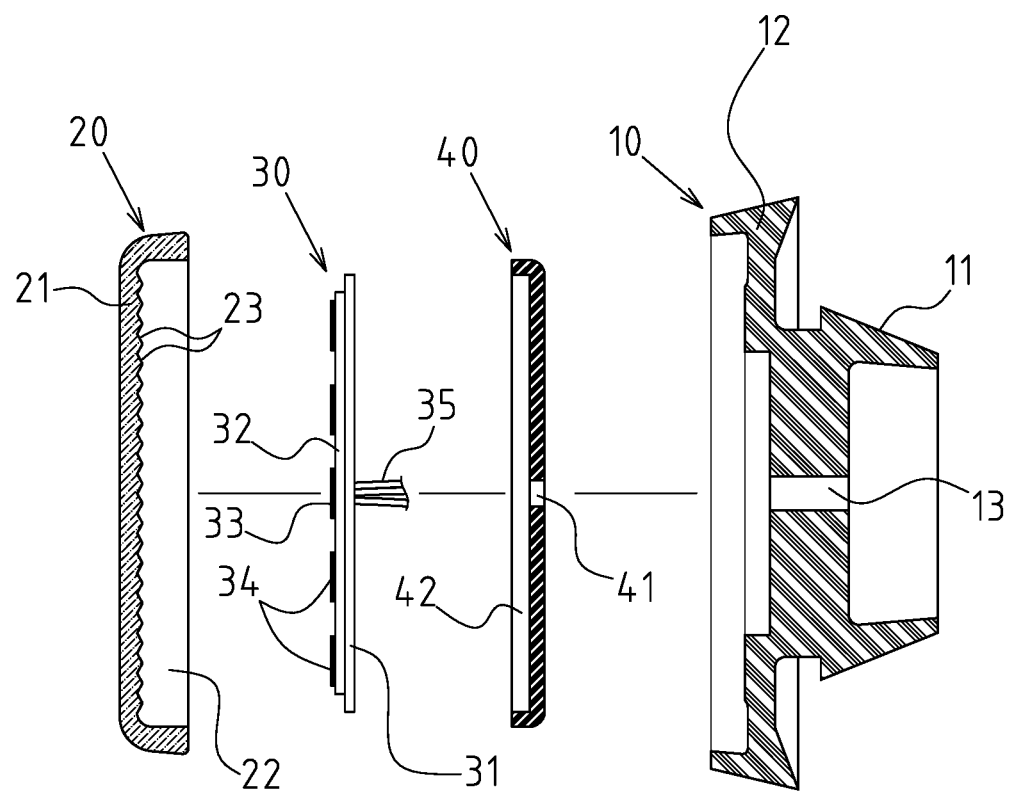
FIG. 9 is an exploded sectional view of the second preferred embodiment of the present invention.
Figure 10:
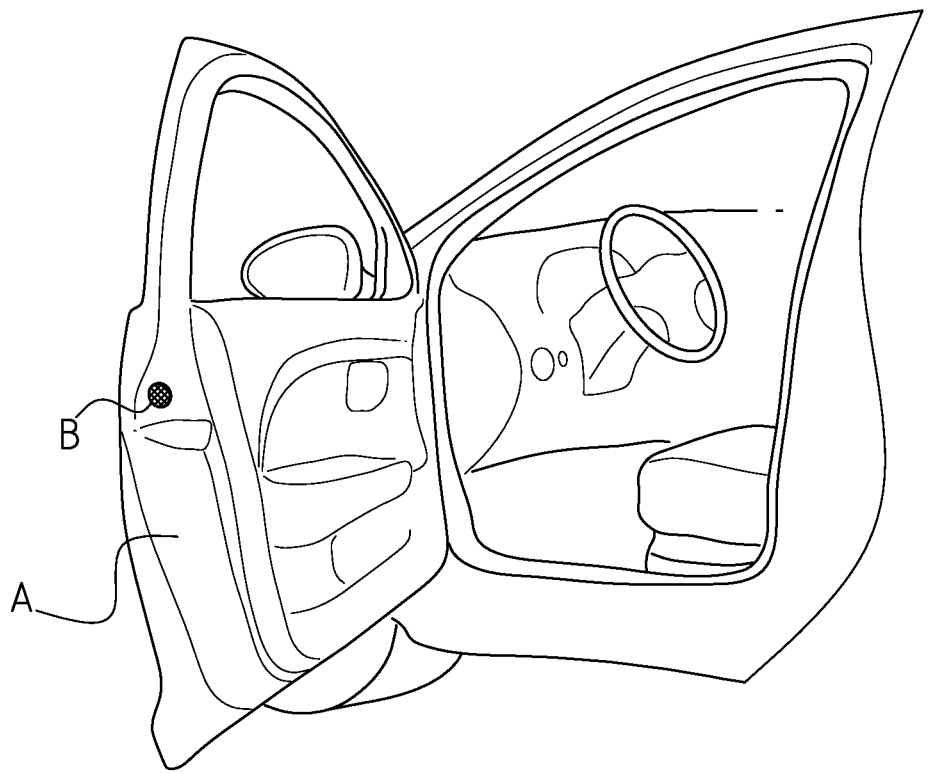
FIG. 10 is an operating condition reference diagram of the second preferred embodiment of the present invention.
Figure 11:
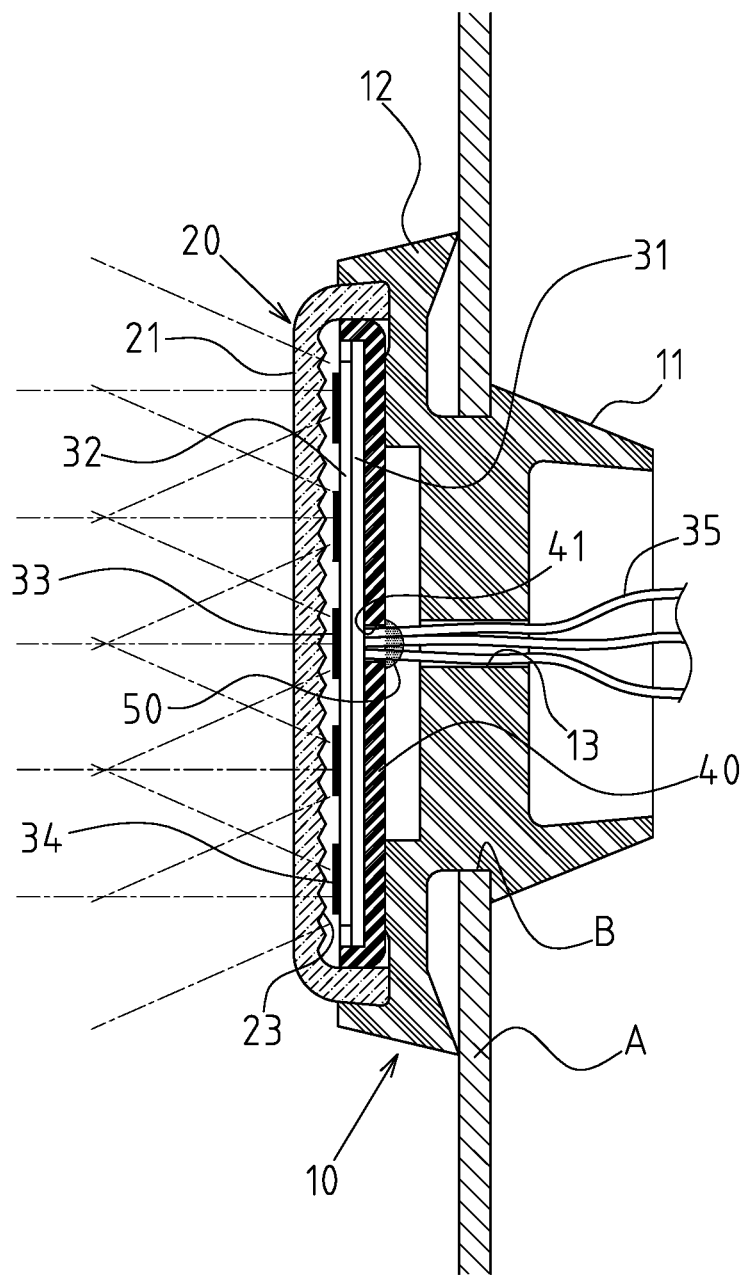
FIG. 11 is a sectional view of the second preferred embodiment of the present invention mounted on the car door.

As shown in FIGS. 8, 9 and 11, in this preferred embodiment, the car door grommet plug comprises a shell 40 located in the holder 10, the shell 40 has a recess 42 for holding the substrate 31. A second punch hole 41 is formed in the bottom surface of the recess 42 for the plural power cords 35 to penetrate through the shell 40. There is waterproof glue 50 coated between the power cords 35 and the circumference of the second punch hole 41 to provide waterproof effect.

Based on the aforesaid structure design, the actuation of the present invention is described below. When the user closes car door A, the sensor 33, 73 senses (magnetic induction) the metal car body, so the drive circuit 32, 72 will not actuate the illuminators 34, 74 to project light outwards. When the user opens car door A, the magnetic induction environment of sensor 33, 73 is changed, the sensor 33, 73 actuates the drive circuit 32, 72, and the illuminators 34, 74 project light outwards, providing caution for the vehicles or pedestrians coming from behind. Said first preferred embodiment can use the control circuit 75 to change the light emission mode of the illuminators 74 (e.g. continuous lighting or flicker) and the color of the projected light rays, enhancing the caution effect on the vehicles or pedestrians coming from behind.

I claim:
1. A car door grommet plug comprises:
   a holder, the holder is made of flexible material and embedded in the circumference of car door grommet; the holder comprises a plug-in unit and a flange around the plug-in unit;
   a light-emitting unit, the light-emitting unit is located in the holder and electrically connected to a power supply; the light-emitting unit comprises a substrate, a drive circuit is laid on the top surface of the substrate, a sensor and plural illuminators; the drive circuit is electrically connected to the power supply, and the sensor and the illuminators are electrically connected to the drive circuit respectively; when the sensor is actuated as the ambient environment factor changes, the drive circuit uses the electric energy supplied from the power supply to drive the illuminators to project light outwards;
   a top cap made of transparent material, the top cap is mounted on the holder and positioning the substrate of the light-emitting unit; the circumference of the top cap is held in the holder; and
   a shell located in the holder, the light-emitting unit is restrained in the shell.

2. The structure defined in claim 1, wherein the shell is a cylindrical structure; the shell has a closed end and an open end; the power supply is held in the shell.

3. The structure defined in claim 2, wherein the top cap is provided with at least one lens structure, so as to change the characteristic of the light projected outwards from the illuminators; the top cap comprises a disc body and a skirt body extended from the underside of the disc body, the at least one lens structure is mounted on the disc body.

4. The structure defined in claim 3, wherein a punch hole for the open end of the shell is formed in the holder, and a ring slot is formed at the top of the inner wall of the punch hole, the circumference of the disc body is held in the ring slot; a ring groove is formed in the exterior of the holder, when the holder is combined with car door, the ring groove holds the circumference of car door grommet, so as to position the holder.

5. The structure defined in claim 2, wherein the substrate is provided with a control circuit, the control circuit is electrically connected to the drive circuit, so as to change the light emission mode of the illuminators and the color of the projected light rays.

6. The structure defined in claim 3, wherein the substrate is provided with a control circuit, the control circuit is electrically connected to the drive circuit, so as to change the light emission mode of the illuminators and the color of the projected light rays.

7. The structure defined in claim 4, wherein the substrate is provided with a control circuit, the control circuit is electrically connected to the drive circuit, so as to change the light emission mode of the illuminators and the color of the projected light rays.

8. The structure defined in claim 5, wherein the substrate is provided with a booster circuit, the booster circuit is electrically connected to the drive circuit, so as to increase the voltage supplied from the power supply to a suitable voltage for the light-emitting unit when the power supply has voltage drop.

9. The structure defined in claim 6, wherein the substrate is provided with a booster circuit, the booster circuit is electrically connected to the drive circuit, so as to increase the voltage supplied from the power supply to a suitable voltage for the light-emitting unit when the power supply has voltage drop.

10. The structure defined in claim 7, wherein the substrate is provided with a booster circuit, the booster circuit is electrically connected to the drive circuit, so as to increase the voltage supplied from the power supply to a suitable voltage for the light-emitting unit when the power supply has voltage drop.

11. The structure defined in claim 3, wherein the interior of open end of the holder is provided with an internal thread part, and the exterior of the skirt body is provided with an external thread part fixed to the internal thread part; when the internal and external thread parts are screwed together, the end of the skirt body presses and positions the substrate of the light-emitting unit.

12. The structure defined in claim 4, wherein the interior of open end of the holder is provided with an internal thread part, and the exterior of the skirt body is provided with an external thread part fixed to the internal thread part; when the internal and external thread parts are screwed together, the end of the skirt body presses and positions the substrate of the light-emitting unit.

13. The structure defined in claim 11, wherein the sensor is any one selected from the group of magnetic reed switch, magnetic induction switch and electromagnetic switch.

14. The structure defined in claim 12, wherein the sensor is any one selected from the group of magnetic reed switch, magnetic induction switch and electromagnetic switch.

15. The structure defined in claim 1, wherein the top cap comprises a light transmission plane and forms a holding space, and the substrate and the plural illuminators are held in the holding space.

16. The structure defined in claim 15, wherein a first punch hole is axially formed in the holder; the drive circuit is electrically connected to plural power cords; the power cords are electrically connected to the power supply through the first punch hole of the holder.

17. The structure defined in claim 16, wherein a recess for holding the substrate is formed in the shell, a second punch hole is formed in the bottom surface of the recess for the plural power cords to penetrate through the shell.

18. The structure defined in claim 17, wherein the inner wall of light transmission plane of the top cap is provided with serrated reflection array.

* * * * *